J. MATTHIAS.
Improvement in Glue-Pots.
No. 130,061. Patented July 30, 1872.
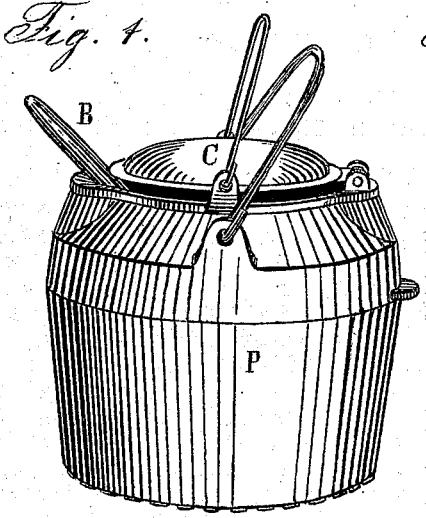
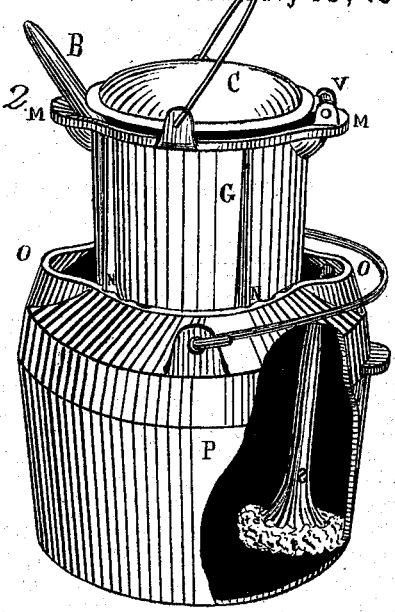
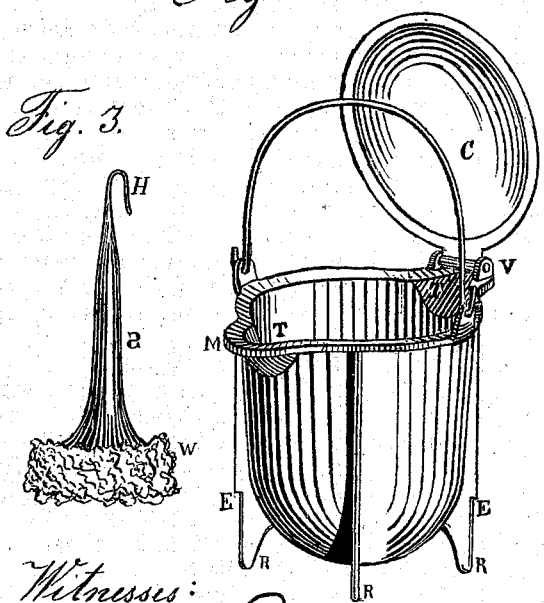
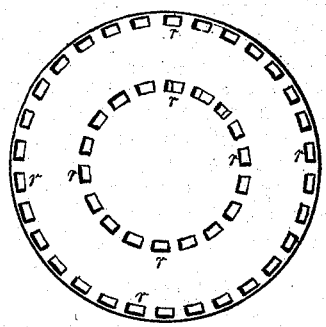
Witnesses:
H Standish Bradford
R. B. Dimham
Inventor
Joseph Matthias

UNITED STATES PATENT OFFICE.

JOSEPH MATTHIAS, OF NEW YORK, N. Y.

IMPROVEMENT IN GLUE-POTS.

Specification forming part of Letters Patent No. 130,061, dated July 30, 1872.

SPECIFICATION.

*To all whom it may concern:*

Be it known that I, JOSEPH MATTHIAS, of the city, county, and State of New York, have invented a new and Improved Glue-Pot; and I do hereby declare that the following is a clear, full, and exact description thereof, which will enable others to understand the same, reference being had to the accompanying drawing forming part of this specification.

The old-fashioned glue-pot, constructed of an inner and an outer pot, the former containing the glue and the latter water, has this serious difficulty about it: When the water is heated to melt the glue, there being no means for the steam to escape, the inner pot is forced up and the water boils over upon the stove or fire, often putting out the fire, and always causing great trouble. It is to avoid this difficulty and to furnish a glue-pot which cannot boil over, that I have invented some of the improvements herein described.

Moreover, in the practical use of a glue-pot it is often necessary to pour some of the hot water into the glue to reduce its consistency. It is difficult to do this by taking hold of the handle merely, without splashing the water over onto other objects; hence I have devised an improvement to remedy this trouble by means of a lip and a knob or projection.

Again, when a person uses the glue it is necessary to swab off the extra amount or surplus beyond the joint, or it will soon harden, and is then very difficult to remove; I have, hence, devised an attachment to a glue-pot which is almost as necessary as the brush itself.

Finally, it is often desired to heat the glue in a hurry; and in using the old-fashioned pot, it having a flat bottom, when it was set directly upon the stove or fire, the glue at the bottom of the pot often was burned before the whole was heated through; I have invented, to overcome this fault, a modification of the inner pot, placing a round bottom upon it to radiate the heat, and elevating it upon legs.

The first part of my invention consists of a modification of the inner pot, substantially as is shown in Figure IV. M E R represent one of several projecting perpendicular ribs, extending from the outer surface of the pot, and furnished with notches or jogs at E, or elsewhere along the rib providing a means of elevating and supporting the pot on the rim of the outer one, as is shown in Fig. II; for the steam escaping and passing up and around the inner pot heats it as much and readily as though it were immersed in the hot water. R R R represent the legs from the oval or round bottom of the inner pot, furnishing a means of elevating the bottom of the vessel from the excessive heat when placed directly upon a stove. T T represent opposite lips, serving as covers for the lips or openings of the outer pot, and also as receptacles for the brush B, and the attachment or rest for the hinge of the cover C. C represents a cover secured to the pot by the hinge V.

The second part of my invention consists of a modification of the outer pot, substantially as follows, as is shown in Figs. IV and V: Fig. V represents the bottom of the outer pot with a series of elevations, r r, or projections from it, so as to slightly elevate it from the hot surface or stove. Fig. II represents a side view of the outer pot with the inner pot elevated upon its rim. O O represent two lips, and L an external knob or projection. By grasping the handle with the four fingers, and placing the thumb upon the knob L, the outer pot is readily inclined, so that one can pour the water out of the opposite lip O with great accuracy. The other lip O serves as a receptacle for the swab.

The third part of my invention consists of an attachment to a glue-pot, represented by Fig. III. H is a hook at one end of a handle, which serves to hold the whole in the water when not in use by catching upon a rod across the lip O of the outer pot. S is a metallic handle with a wide opening at one end for the insertion of a sponge. W is a sponge or mop attached to the handle S.

I claim as my improvements—

1. The glue-pot with a round or oval bottom, external projecting ribs, provided with notches or jogs, legs, lips, or openings at the rim, and a cover, substantially as and for the purposes hereinbefore set forth, and shown in the drawing hereunto attached.

2. The water-pot with an external knob or projection, opposite lips or openings at the rim, and elevations or projections from its bottom, substantially as and for the purposes hereinbefore set forth, and shown in the drawing hereunto attached.

3. The combination of a water-pot and glue-pot, constructed each as hereinbefore set forth, to form an elevated glue-pot, substantially as and for the purposes hereinbefore set forth, and shown in the drawing hereunto attached.

4. The swab or mop, substantially as and for the purposes hereinbefore set forth, and shown in the drawing hereunto attached.

JOSEPH MATTHIAS.

Witnesses:
 H. STANDISH BRADFORD,
 R. B. DUNHAM.